US012785084B2

(12) United States Patent
Huang et al.

(10) Patent No.: US 12,785,084 B2
(45) Date of Patent: Nov. 3, 2026

(54) POSITIVE ELECTRODE MATERIAL AND PREPARATION METHOD THEREFOR, POSITIVE ELECTRODE PLATE, AND BATTERY

(71) Applicant: BTR NANO TECH CO., LTD., Shenzhen (CN)

(72) Inventors: Youyuan Huang, Shenzhen (CN); Hongxu Zhang, Shenzhen (CN); Liang Luo, Shenzhen (CN); Wuwei Yan, Shenzhen (CN); Shunyi Yang, Shenzhen (CN)

(73) Assignee: BTR NANO TECH CO., LTD., Shenzhen (CN)

( * ) Notice: Subject to any disclaimer, the term of this patent is extended or adjusted under 35 U.S.C. 154(b) by 544 days.

(21) Appl. No.: 18/283,848

(22) PCT Filed: Sep. 6, 2022

(86) PCT No.: PCT/CN2022/117165
§ 371 (c)(1),
(2) Date: Sep. 25, 2023

(87) PCT Pub. No.: WO2023/036102
PCT Pub. Date: Mar. 16, 2023

(65) Prior Publication Data

US 2024/0162421 A1 May 16, 2024

(30) Foreign Application Priority Data

Sep. 9, 2021 (CN) ........................ 202111052713.9

(51) Int. Cl.

*H01M 4/36* (2006.01)
*C01G 53/42* (2025.01)
*H01M 4/525* (2010.01)

(52) U.S. Cl.

CPC ............ *H01M 4/366* (2013.01); *C01G 53/42* (2013.01); *H01M 4/525* (2013.01);
(Continued)

(58) Field of Classification Search

CPC ...... H01M 4/366; H01M 4/525; C01G 53/42; C01P 2002/54; C01P 2002/85; C01P 2004/03; C01P 2004/86; C01P 2006/40
See application file for complete search history.

(56) References Cited

U.S. PATENT DOCUMENTS

2014/0205898 A1 7/2014 Lee et al.
2020/0358096 A1 11/2020 Paulsen et al.

FOREIGN PATENT DOCUMENTS

CN 1412120 A 4/2003
CN 101436663 A 5/2009
(Continued)

OTHER PUBLICATIONS

International search report of PCT Patent Application No. PCT/CN2022/117165 issued on Nov. 24, 2022.
(Continued)

*Primary Examiner* — Sarah A. Slifka

(57) ABSTRACT

The present disclosure relates to the technical field of cathode materials, and provides a cathode material and a preparation method therefor, a cathode sheet, and a battery. The preparation method includes the following steps: coating the surface of spherical nickel hydroxide with a lithium compound, a divalent cobalt compound, a trivalent cobalt compound, and an optional compound M, and then carrying out primary sintering on the coated material under an oxygen atmosphere, wherein the molar content of the trivalent cobalt compound in the cobalt compound is 50%-85%.

20 Claims, 5 Drawing Sheets

(52) U.S. Cl.
CPC ...... *C01P 2002/54* (2013.01); *C01P 2002/85* (2013.01); *C01P 2004/03* (2013.01); *C01P 2004/86* (2013.01); *C01P 2006/40* (2013.01)

(56) References Cited

FOREIGN PATENT DOCUMENTS

| | | | |
|---|---|---|---|
| CN | 102683673 | A | 9/2012 |
| CN | 103985857 | A | 8/2014 |
| CN | 105185962 | A | 12/2015 |

OTHER PUBLICATIONS

Gu, Daming et al., Electrochemical Performance of LiCoO2 Gradient Coated LiNi0.96Co0.04O2 Cathode, Chinese Journal of Inorganic Chemistry, May 2005, p. 726, vol. 21, No. 5.

First office action of counterpart Chinese Patent Application No. 202111052713.9 issued on Jan. 17, 2025.

POSITIVE ELECTRODE MATERIAL AND PREPARATION METHOD THEREFOR, POSITIVE ELECTRODE PLATE, AND BATTERY

CROSS-REFERENCE TO RELATED APPLICATIONS

The present disclosure claims priority to Chinese Patent Application No. CN202111052713.9 filed with China National Intellectual Property Administration on Sep. 9, 2021 and entitled "Positive Electrode Material and Preparation Method Therefor, Positive Electrode Plate, and Battery", which is hereby incorporated by reference in its entirety.

TECHNICAL FIELD

The present disclosure relates to the technical field of cathode materials, and in particular to a cathode material (a positive electrode material) and a preparation method therefor, a cathode sheet (a positive electrode plate), and a battery.

BACKGROUND

In recent years, lithium-ion batteries have been widely used in various fields such as automobiles and mobile devices due to high voltage, high energy density, and long service life, and the main performance of lithium-ion batteries is directly determined by a cathode material. With the increasing demand for the energy density of batteries in the market, nickel rich materials have become one of the most promising cathode materials of lithium-ion batteries.

However, the nickel rich material often has the disadvantages of poor cycle performance and low safety, and therefore, the development of a nickel rich cathode material with long cycle and high safety becomes a task required to be solved urgently by those skilled in the art.

SUMMARY

The present disclosure provides a cathode material, which comprises a lithium-nickel composite oxide particle, wherein an outer surface of the lithium-nickel composite oxide particle is coated with a lithium cobalt oxide (lithium cobaltate) coating layer, and a cobalt element is distributed inside the lithium-nickel composite oxide particle; a general formula of the lithium-nickel composite oxide is $Li_aNi_{1-x-y}Co_xM_yO_2$, wherein $0.95 \le a \le 1.10$, $0 < x \le 0.05$, $0 \le y \le 0.005$, and M comprises at least one of a group 2 element, a group 13 element and a transition metal element, and does not comprise nickel and cobalt.

Optionally, a molar content of cobalt element inside the lithium-nickel composite oxide particle is gradually reduced from the outside to the center.

Optionally, the reduction rate of the molar content of the cobalt element is 0.025 mol %/μm to 0.3 mol %/μm starting from the outer surface of the lithium-nickel composite oxide particle and extending from the outside to the center.

Optionally, the lithium-nickel composite oxide particle has divalent cobalt and trivalent cobalt distributed, the divalent cobalt is distributed inside the lithium-nickel composite oxide particle, and the trivalent cobalt is distributed on a surface of the lithium-nickel composite oxide particle.

Optionally, in the cathode material, nickel has a molar content more than 94%.

Optionally, the lithium-nickel composite oxide particle has an average particle size of 3 μm to 17 μm.

Optionally, the lithium cobalt oxide coating layer has a thickness of 20 nm to 200 nm.

Optionally, M comprises at least one of Mg, Ca, Sr, Ba, B, Al, Ti, Zr, V, Nb, Ta, Y, Mo, W, La, Ce, and Gd.

The method for preparing the cathode material provided by the present disclosure comprises the following steps:

coating a composite containing a lithium compound, a cobalt compound, and an M compound on a surface of nickel hydroxide, and sintering the coated material under an oxygen atmosphere to obtain the cathode material, wherein the cobalt compound comprises a divalent cobalt compound and a trivalent cobalt compound, and M in the M compound comprises at least one of a group 2 element, a group 13 element and a transition metal element, and does not comprise nickel and cobalt.

Optionally, the M compound comprises at least one of an oxide of M, a hydroxide of M, and a phosphate of M.

Optionally, a molar content of the cobalt compound in the mixture of the nickel hydroxide and the cobalt compound is 0.5% to 5%.

Optionally, a molar content of the trivalent cobalt compound in the cobalt compound is 50% to 85%.

Optionally, the lithium compound comprises at least one of lithium hydroxide or lithium carbonate.

Optionally, the cobalt compound comprises at least one of cobalt hydroxide, cobalt oxyhydroxide, cobalt monoxide, and cobaltic oxide.

Optionally, the lithium compound, the cobalt compound, and the optional M compound are coated on the surface of the nickel hydroxide in solid-phase mixing.

Optionally, the solid-phase mixing comprises mechanical mixing.

Optionally, a ratio of the sum of molar contents of the nickel hydroxide, the cobalt compound and the M compound to a molar content of the lithium compound is 1:0.95-1.1.

Optionally, the nickel hydroxide has an average particle size of 3 μm to 17 μm.

Optionally, the nickel hydroxide is spherical.

Optionally, a content of oxygen in the oxygen atmosphere is greater than or equal to 98%.

Optionally, the sintering is performed at a temperature of 600° C. to 750° C. for 8 h to 20 h.

Optionally, the method for preparing the cathode material further comprises steps of washing, drying, and secondary sintering sequentially performed after sintering.

Optionally, the secondary sintering is performed at a temperature of 250° C. to 700° C. for 5 h to 15 h.

Optionally, the secondary sintering is performed in the oxygen atmosphere.

Optionally, a content of oxygen in the oxygen atmosphere is greater than or equal to 90%.

Optionally, M is at least one selected from Mg, Ca, Sr, Ba, B, Al, Ti, Zr, V, Nb, Ta, Y, Mo, W, La, Ce, and Gd.

The present disclosure provides a cathode sheet comprising the cathode material prepared by the method according to any one of the above.

The present disclosure further provides a lithium-ion battery comprising the cathode sheet.

BRIEF DESCRIPTION OF THE DRAWINGS

To describe the technical solutions in specific embodiments of the present disclosure or in the prior art more clearly, the following briefly describes the accompanying drawings for describing the specific embodiments or the prior art. It is clear that the accompanying drawings in the following description show some embodiments of the present disclosure, and those of ordinary skill in the art may still derive other drawings from these accompanying drawings without creative efforts.

DETAILED DESCRIPTION OF THE EMBODIMENTS

Figure 1:
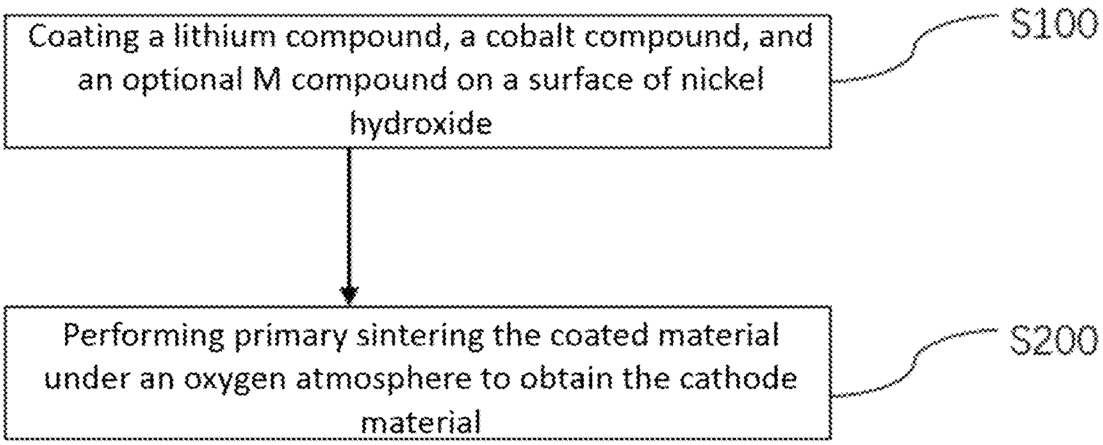
FIG. 1 is a flowchart of a preparation process for a cathode material according to the present disclosure.

The following clearly and completely describes the technical solutions of the present disclosure with reference to the embodiments and examples. Apparently, the described embodiments and examples are merely some but not all of the embodiments and examples of the present disclosure. Based on the embodiments and examples of the present disclosure, all other embodiments and examples obtained by those of ordinary skill in the art without creative efforts fall within the protection scope of the present disclosure.

It is well known that particles in a cathode material are secondary particles, and the secondary particles are spherical particles formed by stacking primary particles. In the conventional technology, a cathode material is often coated to obtain an electrode material with high cycle performance. However, the coating can only be coated on the surfaces of the spherical secondary particles, but cannot be coated on the surfaces of the internal primary particles. At present, some research and development personnel use a method of mixing and sintering a precursor and a lithium compound to obtain the $LiNiMO_2$ compound, and then perform mixing and coating in a liquid phase or solid phase mode to obtain a Co-coated nickel rich cathode material, wherein a Co coating layer is mainly concentrated near a surface layer of the lithium-nickel compound, an effective coating layer is not formed at a grain boundary inside the material, and an MO oxide coating layer is easily formed on a surface of the material. Consequently, the impedance of the material is increased, and the rate capability of the material is reduced, which affects the performance and the internal resistance increase rate of the material after long-cycle. To reduce the impedance of the material and improve the rate capability of the material, an embodiment of the present disclosure provides a cathode material, which comprises a lithium-nickel composite oxide particle, wherein an outer surface of the lithium-nickel composite oxide particle is coated with a lithium cobalt oxide coating layer, and a cobalt element is distributed inside the lithium-nickel composite oxide particle; and a general formula of the lithium-nickel composite oxide is $Li_aNi_{1-x-y}Co_xM_yO_2$, wherein $0.95 \le a \le 1.10$, $0 < x \le 0.05$, $0 \le y \le 0.005$, and M comprises at least one of a group 2 (namely group IIA) element, a group 13 (namely group IIIA) element and a transition metal element, and does not comprise nickel and cobalt. Typically, but not by way of limitation, a is for example 0.95-1.10, 0.97-1.10, 0.99-1.10, or 0.95-1.07, such as 0.95, 0.98, 1, 1.02, 1.05, 1.08, or 1.1; x is for example 0.01-0.05, 0-0.04, or 0.01-0.04, such as 0, 0.01, 0.02, 0.03, 0.04, or 0.05; and y is for example 0-0.005, 0.001-0.005, 0.001-0.004, or 0-0.003, such as 0, 0.001, 0.002, 0.003, 0.004, or 0.005.

Typically, but not by way of limitation, M is at least one selected from Mg, Ca, Sr, Ba, B, Al, Ga, In, Ti, V, Nb, Ta, Y, W, La, Ce, Gd, Mn, Fe, Cu, Zn, Mo, Ce, and Zr.

According to the cathode material provided by the present disclosure, the lithium cobalt oxide is coated on a surface of the lithium-nickel composite oxide particle, so that the side reaction between the lithium-nickel composite oxide particle and an electrolyte is effectively inhibited, the conductivity of lithium ions is improved. The cobalt element is distributed inside the lithium-nickel composite oxide particle, lithium cobalt oxide or lithium M cobalt oxide is formed at a grain boundary, and a crystal structure of the lithium-nickel composite oxide is stabilized, so that the rate capability and the cycle stability of the cathode material are effectively improved.

In an optional embodiment of the present disclosure, a molar content of cobalt element inside the lithium-nickel composite oxide particle is gradually reduced from the outside to the center (or a mass content of the cobalt element is gradually reduced), so as to facilitate formation of lithium nickel cobalt oxide or lithium nickel M cobalt oxide near an outer surface layer of the lithium-nickel composite oxide particle, effectively stabilize the crystal structure inside the lithium-nickel composite oxide, inhibit disordering of lithium and nickel, and thereby effectively improve the structural stability of the cathode material.

In an embodiment of the present disclosure, the molar content of the cobalt element is gradually reduced starting from the outer surface of the lithium-nickel composite oxide particle and extending from the outside to the center, wherein the reduction rate is 0.025 mol %/μm to 0.300 mol %/μm.

It is believed, without being bound by theory, that the reduction rate is calculated by using the molar content (represented as M0) of the cobalt element in the outer surface of the lithium-nickel composite oxide particle as a base point, selecting any point in the direction extending from the outside to the center, and determining the molar content (represented as M1) of the cobalt element at this point, wherein the reduction rate is calculated by the formula $(M0-M1)/M0 \times 100\%$.

According to the present disclosure, the distribution of material Co is controlled, the content of Ni outside the material is low, and the stability is improved; and the content of Ni inside the material is higher, and the material capacity is improved. The concentration gradient in the present disclosure can be more favorable for stabilizing the crystal structure inside the lithium-nickel composite oxide, and the structural stability of the cathode material is improved. If the concentration gradient is too low, the effect cannot be achieved, and if the concentration gradient is too high, the material lattice cannot be matched, consequently, lattice stress is accumulated, and the particle is easy to crack.

Typically, but not by way of limitation, the reduction rate of the molar content of cobalt element is, for example, 0.03 mol %/μm to 0.3 mol %/μm, 0.03 mol %/μm to 0.25 mol %/μm, 0.03 mol %/μm to 0.2 mol %/μm, or 0.1 mol %/μm to 0.3 mol %/μm, such as 0.025 mol %/μm, 0.035 mol %/μm, 0.045 mol %/μm, 0.055 mol %/μm, 0.08 mol %/μm, 0.1 mol %/μm, 0.15 mol %/μm, 0.2 mol %/μm, 0.25 mol %/μm, or 0.30 mol %/μm.

In an optional embodiment of the present disclosure, the molar content of nickel in the cathode material is greater than 94%, so that the cathode material provided by the present disclosure has the higher capacity advantage; and the present disclosure is operable in adjusting the Ni content by controlling the Co content.

The molar content of nickel refers to the ratio of the molar content of nickel element in the cathode material, based on the sum of the amounts of substance of nickel, lithium, cobalt and optional M element as 100%.

Typically, but not by way of limitation, in the cathode materials provided by the present disclosure, the molar content of nickel is, for example, 94.1% to 96%, 94.5% to 96%, or 94.1% to 95.5%, such as 94.1%, 94.2%, 94.5%, 94.8%, 95%, 95.5%, or 96%.

In an embodiment of the present disclosure, the average particle size of the lithium-nickel composite oxide particle is 3 μm to 17 μm to facilitate uniform distribution in the cathode sheet.

Typically, but not by way of limitation, the average particle size of the lithium-nickel composite oxide particle is, for example, 5 μm to 17 μm, 3 μm to 15 μm, or 4 μm to 16 μm, such as 3 μm, 5 μm, 7 μm, 9 μm, 11 μm, 13 μm, 15 μm, or 17 μm.

In an embodiment of the present disclosure, the lithium cobalt oxide coating layer on the surface of the lithium-nickel composite oxide particle has a thickness of 20 nm to 200 nm, so as to reduce the material impedance, ensure the rate capability and the cycle performance of the cathode material, effectively inhibit the side reaction between the lithium-nickel composite oxide and the electrolyte, and improve the conductivity of lithium ions in the cathode material.

Typically, but not by way of limitation, the lithium cobalt oxide coating layer has a thickness of, for example, 30 nm to 200 nm, 30 nm to 190 nm, or 50 nm to 150 nm, such as 20 nm, 25 nm, 30 nm, 40 nm, 50 nm, 60 nm, 70 nm, 80 nm, 90 nm, 100 nm, 120 nm, 150 nm, 180 nm, or 200 nm.

An embodiment of the present disclosure provides a method for preparing a cathode material, which comprises the following steps:

- coating a lithium compound, a cobalt compound, and an optional M compound on a surface of nickel hydroxide, and sintering the coated material under an oxygen atmosphere to obtain the cathode material,
- wherein the cobalt compound comprises a divalent cobalt compound and a trivalent cobalt compound.

An embodiment of the present disclosure provides a method for preparing a cathode material, which comprises the following steps (as shown in FIG. 1):

- S100: coating a lithium compound, a cobalt compound, and an optional M compound on a surface of nickel hydroxide; and
- S200: sintering the coated material under an oxygen atmosphere to obtain the cathode material,
- wherein M comprises at least one of a group 2 element, a group 13 element and a transition metal element, and does not comprise nickel and cobalt; and
- the cobalt compound comprises a divalent cobalt compound and a trivalent cobalt compound.

[M Compound]

In the present disclosure, M comprises at least one of a group 2 element, a group 13 element and a transition metal element, and does not comprise nickel and cobalt.

Typically, but not by way of limitation, M may be selected from, for example, at least one of Mg, Ca, Sr, Ba, B, Al, Ti, Zr, V, Nb, Ta, Y, Mo, W, La, Ce, and Gd.

In the present disclosure, by adding M compound to a raw material, nickel hydroxide is coated to form a lithium nickel M ternary material, so that the phase change of the material is further inhibited, the contraction of unit cells is inhibited, a stable lithium ion transmission channel is provided, the cycle stability and the thermal stability of the material are improved, and the structure of the material is stabilized.

In an embodiment of the present disclosure, the M compound includes, but is not limited to, one of an oxide of M, a hydroxide of M, or a phosphate of M, or a mixture of several therefrom.

[Cobalt Compound]

In the present disclosure, the cobalt compound comprises a divalent cobalt compound and a trivalent cobalt compound.

According to the present disclosure, the divalent cobalt compound and the trivalent cobalt compound are used to coat the nickel hydroxide together, wherein the divalent cobalt has higher reactivity and is easier to diffuse into the nickel hydroxide in the sintering process to form lithium nickel cobalt oxide or lithium nickel M cobalt oxide solid solution oxide, so that the crystal structure in the lithium-nickel composite oxide particle is stabilized, and the disordering of lithium and nickel is inhibited; and the trivalent cobalt tends to coat the surface of the lithium-nickel composite oxide particle to form a lithium cobalt oxide coating layer, so that the side reaction between the materials is inhibited, and the conductivity of lithium ions in the cathode material is improved.

In some embodiments of the present disclosure, a molar content of the trivalent cobalt compound in the cobalt compound is 50% to 85%.

The molar content of the trivalent cobalt compound affects the thickness of the coating layer and the stability of the crystal structure inside the lithium-nickel composite oxide particle. In the present disclosure, when the molar content of the trivalent cobalt compound in the cobalt compound is 50% to 85%, a coating layer with a moderate thickness can be formed on the outer surface of the lithium-nickel composite oxide particle, so that the conductivity of lithium ions is improved, and the impedance of the material is reduced; and a certain amount of Co can be ensured to be doped inside the lithium-nickel composite oxide particle, so that sufficient lithium nickel cobalt oxide or lithium nickel M cobalt oxide solid solution oxide can be effectively formed, the disordering of lithium and nickel can be effectively inhibited, and the cycle stability of the cathode material can be improved.

The applicant finds that if the molar content of the trivalent cobalt compound is too low, more Co element is doped inside the lithium nickel oxide particle in the sintering process, which causes the reduction of the coating effect of the material; and if the molar content of the trivalent cobalt compound is too high, no sufficient Co element is doped inside the lithium-nickel composite oxide particle, and sufficient lithium nickel cobalt oxide or lithium nickel M cobalt oxide solid solution oxide cannot be formed. Consequently, the disordering of lithium and nickel cannot be effectively inhibited, and meanwhile, the coating layer is too thick, the impedance of the material is increased, and the rate capability of the material is affected.

According to the present disclosure, the Co element is coated on the surface of the lithium-nickel composite oxide particle to form the lithium cobalt oxide coating layer, so that the conductivity of lithium ions in the cathode material is improved, a high lithium ion conductivity network is formed, the rate capability of the material is improved, and the side reaction between the material and electrolyte is inhibited.

Typically, but not by way of limitation, in the present disclosure, the molar content of the trivalent cobalt compound in the cobalt compound is, for example, 55% to 85%, 50% to 80%, or 69% to 85%, such as 50%, 60%, 65%, 70%, 75%, 80%, or 85%.

In an embodiment of the present disclosure, the divalent cobalt compound includes, but is not limited to, at least one of divalent cobalt oxide, divalent cobalt hydroxide, and divalent cobalt oxyhydroxide; and the trivalent cobalt compound includes, but is not limited to, at least one of trivalent cobalt oxide, trivalent cobalt hydroxide, and trivalent cobalt oxyhydroxide.

The method for preparing the cathode material provided by the present disclosure is simple, stable and safe, and is easy for large-scale industrial production. The preparation method provides an embodiment of coating the spherical nickel hydroxide with the divalent cobalt compound and the trivalent cobalt compound before sintering, so that not only can a uniform lithium cobalt oxide coating layer be formed on the surface of lithium cobalt oxide particle, but also cobalt doping can be formed inside the lithium nickel oxide particles. The phase change of the material and the side reaction between the material and the electrolyte can be effectively inhibited, and the rate capability, cycle stability, and capacity advantage of the material are remarkably improved.

[Amount of Cobalt Compound]

In the present disclosure, the cobalt compound, the lithium compound, and the optional M compound are coated on the surface of the nickel hydroxide and then sintered, the cobalt element is simultaneously coated on the surface of the lithium-nickel composite oxide particle and distributed in a gradient manner inside the lithium-nickel composite oxide particle, and the amount of the cobalt compound affects the thickness of the coating layer and the stability of the crystal structure of the lithium-nickel composite oxide particle.

In an optional embodiment of the present disclosure, a molar content of the cobalt compound in the mixture of nickel hydroxide and cobalt compound is 0.5% to 5%.

In the present disclosure, the molar content of the cobalt compound in nickel hydroxide and cobalt compound refers to the ratio of the amount of substance of cobalt element in the cobalt compound to the sum of the amounts of substance of nickel element in the nickel hydroxide and cobalt element in the cobalt compound, abbreviated as Co/(Co+Ni).

In the present disclosure, Co/(Co+Ni) is in the above range, and not only can a coating layer with a moderate thickness be formed on the surface of lithium nickel oxide particle, thereby effectively ensuring the conductivity of icons in the material, reducing the impedance of the material, but also a nickel rich content is ensured, thereby improving the capacity of the material. Meanwhile, the limited content of the Co element in the present disclosure can achieve the effect of simultaneously coating the surface of the lithium nickel oxide particle and doping inside the lithium nickel oxide particle to stabilize the crystal structure of the lithium nickel oxide particle.

When Co/(Co+Ni) is greater than 5%, the coating layer on the surface of the lithium nickel oxide particle is too thick, consequently, the electronic conductivity of the material is reduced, the impedance of the material is increased, and the nickel content is reduced, which leads to the reduction of the capacity of the material. When Co/(Co+Ni) is less than 0.5%, the content of Co element is too low to achieve the effect of simultaneously coating the surface of the lithium nickel oxide particle and doping inside the lithium nickel oxide particle to stabilize the crystal structure of the lithium nickel oxide particle.

Typically, but not by way of limitation, Co/(Co+Ni) is, for example, 1% to 5%, 0.5% to 4.5%, 1% to 4.5%, or 1% to 4%, such as 0.5%, 0.75%, 0.1%, 0.2%, 0.5%, 0.8%, 1%, 1.5%, 2%, 3%, 4%, 4.5%, or 5%.

Compared with ternary materials, as the content of Ni is increased, $Ni^{2+/4+}$ redox pairs are increased, such that more Li+ can be conveniently extracted, so that the material capacity has a significant advantage.

[Lithium Compound]

In an embodiment of the present disclosure, the lithium compound includes, but is not limited to, lithium hydroxide, lithium carbonate, and a mixture of lithium hydroxide and lithium carbonate.

[Nickel Hydroxide]

In an embodiment of the present disclosure, spherical nickel hydroxide with an average particle size of 3 μm to 17 μm is used as a raw material, so as to facilitate uniform coating of the cobalt compound, lithium hydroxide and optional M compound on the surface of the spherical nickel hydroxide by solid-phase mixing.

Typically, but not by way of limitation, the spherical sodium nickel hydroxide has an average particle size of, for example, 5 μm to 17 μm, 3 μm to 15 μm, or 6 μm to 17 μm, such as 3 μm, 5 μm, 8 μm, 10 μm, 12 μm, 15 μm, or 17 μm.

[Coating Manner]

In an embodiment of the present disclosure, in step S100, the lithium compound, the cobalt compound, and the optional M compound are coated on the surface of the nickel hydroxide in solid-phase mixing, which is simpler in process, more convenient in operation, and more suitable for large-scale production, and reduces the production cost.

In some embodiments, the solid-phase mixing comprises mechanical mixing including, but not limited to, mixing with a high-speed mixer.

[Oxygen Atmosphere]

In an embodiment of the present disclosure, the oxygen atmosphere has an oxygen content greater than or equal to 98% to facilitate the oxygen to participate in the reaction during the sintering process.

[Sintering Condition]

In an embodiment of the present disclosure, the sintering is performed at a temperature of 600° C. to 750° C. for 8 h to 20 h, so as to facilitate the preparation of the cathode material in which cobalt element is doped inside the lithium-nickel composite oxide particle and coated on the surface of the lithium-nickel composite oxide particle.

Typically, but not by way of limitation, the sintering is performed at a temperature of, for example, 600° C. to 700° C., 650° C. to 750° C., or 680° C. to 740° C., such as 600° C., 620° C., 650° C., 680° C., 700° C., 720° C., or 750° C., and the sintering is performed for, for example, 10 h to 20 h, 8 h to 18 h, or 12 h to 20 h, such as 8 h, 9 h, 10 h, 12 h, 15 h, 18 h, or 20 h.

In an embodiment of the present disclosure, the molar ratio of the sum of the amounts of substance of the nickel hydroxide, cobalt compound, and optional M compound to the lithium compound is 1:0.95-1.1.

The sum of the amounts of substance of the nickel hydroxide, the cobalt compound and the optional M compound refers to the sum of the amounts of substance of the nickel element in the nickel hydroxide, the cobalt element (including divalent cobalt and trivalent cobalt) in the cobalt compound and the M element in the optional M compound, and is briefly referred to as the sum of the amounts of substance of Ni, Co and optional M.

The amount of substance of the lithium compound refers to the amount of substance of lithium element in the lithium compound, and is briefly referred to as the amount of substance of Li.

The molar ratio of the sum of the amounts of substance of Ni, Co and optional M to Li is controlled to be 1:0.95-1.1, so that the prepared cathode material has higher nickel content and a more stable structure.

Typically, but not by way of limitation, the molar ratio of the sum of the amounts of substance of Ni, Co and optional M to Li is, for example, 1:0.98-1.1, 1:1-1.1, or 1:0.95-1.09, such as 1:0.95, 1:0.98, 1:1, 1:1.02, 1:1.05, 1:1.08, or 1:1.1.

In an embodiment of the present disclosure, the nickel hydroxide is spherical and has an average particle size of 3 μm to 17 μm.

In an embodiment of the present disclosure, the method for preparing the cathode material further comprises steps of washing, drying, and secondary sintering sequentially performed after sintering, wherein the secondary sintering is performed at a temperature of 250° C. to 700° C. for 5 h to 15 h.

The residual lithium and impurities on the surface of the sintered cathode material are removed through washing, the influence on the high-temperature safety of the material due to the residual lithium on the surface of the material is avoided, and the structural stability of the material is further improved through secondary sintering.

In some embodiments, the sintered material is washed with distilled, deionized or purified water.

Typically, but not by way of limitation, the secondary sintering is performed at a temperature of, for example, 260° C. to 700° C., 300° C. to 700° C., 250° C. to 600° C., or 300° C. to 600° C., such as 250° C., 300° C., 350° C., 450° C., 500° C., 550° C., 600° C., 650° C., or 700° C., and the secondary sintering is performed for, for example, 5 h to 12 h, 6 h to 15 h, or 6 h to 12 h, such as 5 h, 6 h, 7 h, 8 h, 9 h, 10 h, 11 h, 12 h, 13 h, 14 h, or 15 h.

In some embodiments, the secondary sintering is also performed under an oxygen atmosphere with an oxygen content greater than or equal to 90%.

Figure 2:
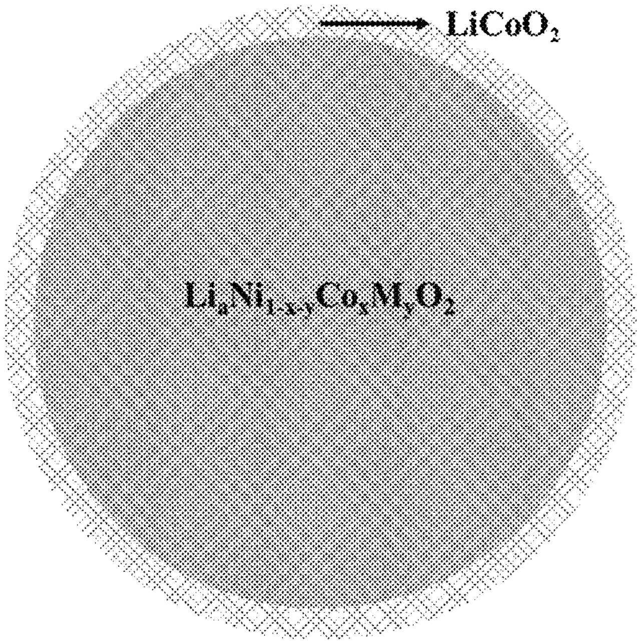
FIG. 2 is a schematic diagram of a structure of a cathode material according to some embodiments of the present disclosure.

In some embodiments, a schematic diagram of a structure of the cathode material provided by the present disclosure is shown in FIG. 2, and it can be seen from FIG. 2, the cathode material provided by the present disclosure has a core-shell structure, wherein an inner core is $Li_aNi_{1-x-y}Co_xM_yO_2$, and a shell layer is lithium cobalt oxide.

An embodiment of the present disclosure provides a cathode material prepared by the method described above.

An embodiment of the present disclosure provides a cathode sheet or a battery comprising the cathode material provided above or the cathode material obtained by the preparation method provided above.

The cathode material provided by the present disclosure is characterized in that the outer surface of lithium-nickel composite oxide particle is coated with a lithium cobalt oxide coating layer, and cobalt elements are distributed inside the cathode material, so that the crystal structure of the lithium-nickel composite oxide can be stabilized, side reaction between the material and electrolyte can be inhibited, and the rate capability and the cycle stability are significantly improved while the conductivity of lithium ions is improved. The cathode material provided by the present disclosure has the advantages of good cycle performance, high safety performance, and the like.

According to the method for preparing the cathode material provided by the present disclosure, the divalent cobalt compound, the trivalent cobalt compound, the lithium hydroxide, and the optional M compound are coated on the surface of the nickel hydroxide and subjected to high-temperature sintering. Part of cobalt element is coated on the surface of lithium nickel oxide particle to form a uniform lithium cobalt oxide coating layer, and part of cobalt element is distributed inside the cathode material of the lithium-nickel composite oxide particle, so that the cobalt element is simultaneously doped inside the material and coated on the surface of the material, the phase change of the material and the side reaction between the material and an electrolyte are effectively inhibited, the conductivity of lithium ions is improved, and the rate capability and the cycle stability of the material are significantly improved.

In addition, the method for preparing the cathode material provided by the present disclosure is simple, stable, and safe, and is easy for large-scale industrial production.

To facilitate understanding of those skilled in the art, the technical embodiments provided in the present disclosure will be further described below with reference to examples and comparative examples.

EXAMPLES

Example 1

This example provided a cathode material, which was prepared based on the following steps:

(1) weighing $Ni(OH)_2$, $Co(OH)_2$, CoOOH, and $LiOH \cdot H_2O$ based on a ratio of the molar weight of Li to the sum of the molar weights of Ni and Co of 1.05, wherein Co accounted for 0.015 of the total molar weight of Ni+Co, CoOOH accounted for 65% of the total molar weight of $Co(OH)_2$ and CoOOH, and $Ni(OH)_2$ was spherical nickel hydroxide with a particle size of 10-15 μm;

(2) mixing $Ni(OH)_2$, $Co(OH)_2$, CoOOH, and $LiOH \cdot H_2O$ by using a high-speed mixer, and sintering the mixture at 680° C. in an atmosphere with an oxygen content greater than or equal to 98% for 10 h to obtain cobalt-coated ultra-nickel rich lithium-nickel-cobalt composite oxide;

(3) washing the cobalt-coated ultra-nickel rich lithium-nickel-cobalt composite oxide by using deionized water, then performing filter pressing, and drying a filter cake in a vacuum oven at 200° C. for 12 h; and (4) performing secondary sintering on the dried material at 600° C. in an atmosphere with the oxygen content greater than or equal to 90% for 8 h to obtain the cathode material.

Example 2

This example provided a cathode material, which was prepared based on the following steps:

(1) weighing $Ni(OH)_2$, CoO, $Co_2O_3$, and $LiOH·H_2O$ based on a ratio of the molar weight of Li to the sum of the molar weights of Ni and Co of 1.05, wherein Co accounted for 0.015 of the total molar weight of Ni+Co, $Co_2O_3$ accounted for 65% of the total molar weight of CoO and $Co_2O_3$, and $Ni(OH)_2$ was spherical nickel hydroxide with a particle size of 3-10 μm;

(2) mixing $Ni(OH)_2$, CoO, $Co_2O_3$, and $LiOH·H_2O$ by using a high-speed mixer, and sintering the mixture at 650° C. in an atmosphere with an oxygen content greater than or equal to 98% for 12 h to obtain cobalt-coated ultra-nickel rich lithium-nickel-cobalt composite oxide;

(3) washing the cobalt-coated ultra-nickel rich lithium-nickel-cobalt composite oxide by using deionized water, then performing filter pressing, and drying a filter cake in a vacuum oven at 200° C. for 12 h; and (4) performing secondary sintering on the dried material at 650° C. in an atmosphere with the oxygen content greater than or equal to 90% for 5 h to obtain the cathode material.

Example 3

This example provided a cathode material, which was prepared based on the following steps:

(1) weighing $Ni(OH)_2$, $Co(OH)_2$, CoOOH, and $LiOH·H_2O$ based on a ratio of the molar weight of Li to the sum of the molar weights of Ni and Co of 1.05, wherein Co accounted for 0.015 of the total molar weight of Ni+Co, CoOOH accounted for 85% of the total molar weight of $Co(OH)_2$ and CoOOH, and $Ni(OH)_2$ was spherical nickel hydroxide with a particle size of 12-17 μm;

(2) mixing $Ni(OH)_2$, $Co(OH)_2$, CoOOH, and $LiOH·H_2O$ by using a high-speed mixer, and sintering the mixture at 700° C. in an atmosphere with an oxygen content greater than or equal to 98% for 10 h to obtain cobalt-coated ultra-nickel rich lithium-nickel-cobalt composite oxide;

(3) washing the cobalt-coated ultra-nickel rich lithium-nickel-cobalt composite oxide by using deionized water, then performing filter pressing, and drying a filter cake in a vacuum oven at 200° C. for 12 h; and (4) performing secondary sintering on the dried material at 550° C. in an atmosphere with the oxygen content greater than or equal to 90% for 12 h to obtain the cathode material.

Example 4

This example provided a cathode material, which was prepared based on the following steps:

(1) weighing $Ni(OH)_2$, $Co(OH)_2$, CoOOH, $Al(OH)_3$, and $LiOH·H_2O$ based on a ratio of the molar weight of Li to the sum of the molar weights of Ni and Co of 1.05, wherein Co accounted for 0.015 of the total molar weight of Ni+Co, CoOOH accounted for 65% of the total molar weight of $Co(OH)_2$ and CoOOH, $Ni(OH)_2$ was spherical nickel hydroxide with a particle size of 10-15 μm, and Al content was 0.1% of the total mass of raw materials;

(2) mixing $Ni(OH)_2$, $Co(OH)_2$, CoOOH, $Al(OH)_3$, and $LiOH·H_2O$ by using a high-speed mixer, and sintering the mixture at 680° C. in an atmosphere with an oxygen content greater than or equal to 98% for 10 h to obtain cobalt-coated ultra-nickel rich lithium-nickel-cobalt composite oxide;

(3) washing the cobalt-coated ultra nickel rich lithium-nickel-cobalt composite oxide by using deionized water, then performing filter pressing, and drying a filter cake in a vacuum oven at 200° C. for 12 h; and (4) performing secondary sintering on the dried material at 600° C. in an atmosphere with the oxygen content greater than or equal to 90% for 10 h to obtain the cathode material.

Example 5

This example provided a cathode material, which was prepared based on the following steps:

(1) weighing $Ni(OH)_2$, $Co(OH)_2$, CoOOH, and $LiOH·H_2O$ based on a ratio of the molar weight of Li to the sum of the molar weights of Ni and Co of 1.05, wherein Co accounted for 0.035 of the total molar weight of Ni+Co, CoOOH accounted for 65% of the total molar weight of $Co(OH)_2$ and CoOOH, and $Ni(OH)_2$ was spherical nickel hydroxide with a particle size of 10-15 μm;

(2) mixing $Ni(OH)_2$, $Co(OH)_2$, CoOOH, and $LiOH·H_2O$ by using a high-speed mixer, and sintering the mixture at 680° C. in an atmosphere with an oxygen content greater than or equal to 98% for 10 h to obtain cobalt-coated ultra-nickel rich lithium-nickel-cobalt composite oxide;

(3) washing the cobalt-coated ultra-nickel rich lithium-nickel-cobalt composite oxide by using deionized water, then performing filter pressing, and drying a filter cake in a vacuum oven at 200° C. for 12 h; and (4) performing secondary sintering on the dried material at 600° C. in an atmosphere with the oxygen content greater than or equal to 90% for 10 h to obtain the cathode material.

Example 6

This example provided a cathode material, which was prepared based on the following steps:

(1) weighing $Ni(OH)_2$, $Co(OH)_2$, CoOOH, $Sr(OH)_2$, and $LiOH·H_2O$ based on a ratio of the molar weight of Li to the sum of the molar weights of Ni and Co of 1.05, wherein Co accounted for 0.035 of the total molar weight of Ni+Co, CoOOH accounted for 50% of the total molar weight of $Co(OH)_2$ and CoOOH, and $Ni(OH)_2$ was spherical nickel hydroxide with a particle size of 10-15 μm;

(2) mixing $Ni(OH)_2$, $Co(OH)_2$, CoOOH, $Sr(OH)_2$, and $LiOH·H_2O$ by using a high-speed mixer, and sintering the mixture at 680° C. in an atmosphere with an oxygen content greater than or equal to 98% for 10 h to obtain cobalt-coated ultra-nickel rich lithium-nickel-cobalt composite oxide;

(3) washing the cobalt-coated ultra-nickel rich lithium-nickel-cobalt composite oxide by using deionized water, then performing filter pressing, and drying a filter cake in a vacuum oven at 200° C. for 12 h; and (4) performing secondary sintering on the dried material at 600° C. in an atmosphere with the oxygen content greater than or equal to 90% for 10 h to obtain the cathode material.

Example 7

This example provided a cathode material, which was prepared based on the following steps:

(1) weighing $Ni(OH)_2$, $Co(OH)_2$, CoOOH, and $LiOH·H_2O$ based on a ratio of the molar weight of Li to the sum of the molar weights of Ni and Co of 1.1, wherein Co accounted for 0.015 of the total molar weight of Ni+Co, CoOOH accounted for 65% of the total molar weight of $Co(OH)_2$ and CoOOH, and $Ni(OH)_2$ was spherical nickel hydroxide with a particle size of 10-15 μm;

(2) mixing $Ni(OH)_2$, $Co(OH)_2$, CoOOH, and $LiOH·H_2O$ by using a high-speed mixer, and sintering the mixture at 680° C. in an atmosphere with an oxygen content greater than or equal to 98% for 10 h to obtain cobalt-coated ultra-nickel rich lithium-nickel-cobalt composite oxide;

(3) washing the cobalt-coated ultra-nickel rich lithium-nickel-cobalt composite oxide by using deionized water, then performing filter pressing, and drying a filter cake in a vacuum oven at 200° C. for 12 h; and (4) performing secondary sintering on the dried material at 600° C. in an atmosphere with the oxygen content greater than or equal to 90% for 10 h to obtain the cathode material.

Example 8

This example provided a cathode material, and the preparation method of the cathode material was different from that of the cathode material in Example 1 in that, in the step (1), Co accounted for 10% of the total molar weight of Ni+Co. All the remaining steps were the same as those in Example 1 and are not described in detail here.

Example 9

This example provided a cathode material, which was prepared based on the following steps:

(1) weighing $Ni(OH)_2$, $Co(OH)_2$, CoOOH, and $LiOH·H_2O$ based on a ratio of the molar weight of Li to the sum of the molar weights of Ni and Co of 0.95, wherein Co accounted for 0.015 of the total molar weight of Ni+Co, CoOOH accounted for 65% of the total molar weight of $Co(OH)_2$ and CoOOH, and $Ni(OH)_2$ was spherical nickel hydroxide with a particle size of 10-15 μm; and (2) mixing $Ni(OH)_2$, $Co(OH)_2$, CoOOH, and $LiOH·H_2O$ by using a high-speed mixer, and sintering the mixture at 680° C. in an atmosphere with an oxygen content greater than or equal to 98% for 10 h to obtain the cathode material.

Example 10

This example provided a cathode material, which was prepared based on the following steps:

(1) weighing $Ni(OH)_2$, $Co(OH)_2$, CoOOH, and $LiOH·H_2O$ based on a ratio of the molar weight of Li to the sum of the molar weights of Ni and Co of 1.0, wherein Co accounted for 0.015 of the total molar weight of Ni+Co, CoOOH accounted for 65% of the total molar weight of $Co(OH)_2$ and CoOOH, and $Ni(OH)_2$ was spherical nickel hydroxide with a particle size of 10-15 μm; and (2) mixing $Ni(OH)_2$, $Co(OH)_2$, CoOOH, and $LiOH·H_2O$ by using a high-speed mixer, and sintering the mixture at 680° C. in an atmosphere with an oxygen content greater than or equal to 98% for 10 h to obtain the cathode material.

Comparative Example 1

This comparative example provided a cathode material, and the preparation method of the cathode material was different from that of the cathode material in Example 1 in that, in the step (1), CoOOH accounted for 10% of the total molar weight of $Co(OH)_2$ and CoOOH. All the remaining steps were the same as those in Example 1 and are not described in detail here.

Comparative Example 2

This comparative example provided a cathode material, and the preparation method of the cathode material was different from that of the cathode material in Example 1 in that, in the step (1), CoOOH accounted for 95% of the total molar weight of $Co(OH)_2$ and CoOOH. All the remaining steps were the same as those in Example 1 and are not described in detail here.

Comparative Example 3

This comparative example provided a cathode material, and the preparation method of the cathode material was different from that of the cathode material in Example 1 in that, in the step (1), all Co compounds in the raw materials were $Co(OH)_2$, and a trivalent cobalt compound was not used in the raw materials. All the remaining steps were the same as those in Example 1 and are not described in detail here.

Comparative Example 4

This comparative example provided a cathode material, and the preparation method of the cathode material was different from that of the cathode material in Example 1 in that, in the step (1), all Co compounds in the raw materials were CoOOH, and a divalent cobalt compound was not used in the raw materials. All the remaining steps were the same as those in Example 1 and are not described in detail here.

Comparative Example 5

This comparative example provided a cathode material, and the preparation method of the cathode material was different from that of the cathode material in Example 1 in that, in the step (1), a cobalt compound was not used in raw materials, and $Ni(OH)_2$ and $LiOH·H_2O$ were weighed based on a ratio of the molar weight of Li to the molar weight of Ni of 1.05. All the remaining steps were the same as those in Example 1 and are not described in detail here.

Test Example 1

The cathode materials provided by Examples 1 to 10 and Comparative Examples 1 to 5 were respectively subjected to surface morphology test using a Hitachi S4800 scanning electron microscope (SEM), and the particle sizes of the cathode materials and the thickness of the surface coating layer were measured, and the results are shown in Table 1 below.

TABLE 1

| | Particle size distribution D50 (μm) | Thickness of coating layer (nm) |
|---|---|---|
| Example 1 | 10.2 | 27 |
| Example 2 | 4.5 | 52 |
| Example 3 | 13.5 | 31 |
| Example 4 | 10.3 | 36 |
| Example 5 | 10.5 | 67 |
| Example 6 | 10.2 | 58 |
| Example 7 | 10.7 | 30 |
| Example 8 | 10.4 | 143 |
| Example 9 | 10.6 | 29 |
| Example 10 | 10.5 | 31 |
| Comparative Example 1 | 10.4 | 9 |
| Comparative Example 2 | 10.2 | 42 |
| Comparative Example 3 | 10.5 | 11 |
| Comparative Example 4 | 10.8 | 49 |
| Comparative Example 5 | 10.3 | / |

Figure 3:
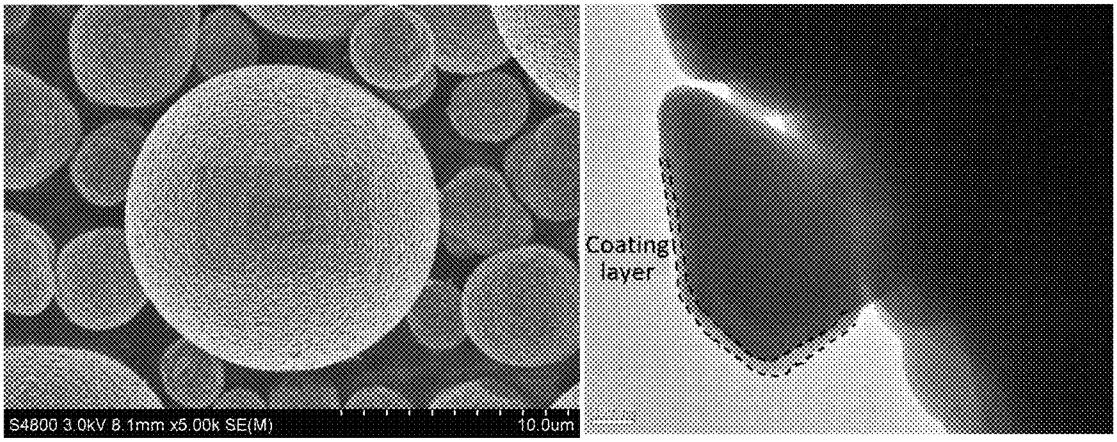
FIG. 3 is an SEM image of a cathode material according to Example 1 of the present disclosure.

Example 1 is taken as an example, FIG. 3 is an SEM image of a cathode material according to Example 1, and it can be seen from FIG. 3 that the particle size of the cathode material provided by Example 1 is 3-17 μm, and the thickness of the coating layer is about 27 nm.

Test Example 2

The cathode materials provided by Examples 1 to 10 and Comparative Examples 1 to 5 were subjected to an X-ray photoelectron spectroscopy (XPS) test, and it can be seen from the XPS spectrogram that the outer coating layers of the cathode materials provided by Examples 1 to 10 and Comparative Examples 1 to 5 are lithium cobalt oxide.

Figure 4:
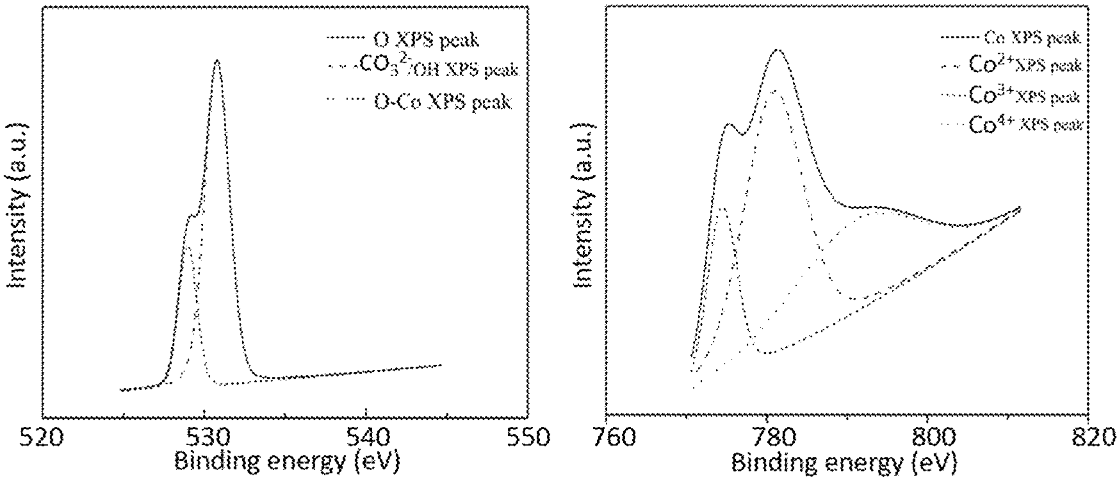
FIG. 4 is an XPS diagram of a cathode material according to Example 1 of the present disclosure.

Example 1 is taken as an example, FIG. 4 is an XPS diagram of a cathode material according to Example 1, and it can be seen from FIG. 4 that a peak 2p3/2 of Co is located at a position where a binding energy is 780 eV, and a peak 1 s of Co—O is located at a position where a binding energy is 529 eV. Therefore, it is noted that the Li—Co—O compound is present on the surface of the material, and the coating layer on the surface of the cathode material provided by Example 1 is mainly lithium cobalt oxide.

Test Example 3

The cathode materials provided by Examples 1 to 10 and Comparative Examples 1 to 5 were subjected to an X-ray energy dispersive spectroscopy (EDS) test, and the results are shown in Table 2. The content of Co was tested respectively at 0 μm, 1 μm, 2 μm, 4 μm and 8 μm in the lithium-nickel composite by taking the lithium-nickel composite oxide as a starting point and extending from the outside to the inside. In view of the fact that the particle size of lithium-nickel composite oxide in some cathode materials was less than 16 μm, lithium-nickel composite oxide with a particle size greater than or equal to 16 μm was selected for the internal Co content test in this test.

TABLE 2

| | Co content (mol %) | | | | |
|---|---|---|---|---|---|
| | 0 μm | 1 μm | 2 μm | 4 μm | 8 μm |
| Example 1 | 1.83 | 1.76 | 1.69 | 1.51 | 1.33 |
| Example 2 | 1.92 | 1.82 | 1.75 | 1.45 | 1.25 |
| Example 3 | 2.13 | 2.02 | 1.95 | 1.56 | 1.09 |
| Example 4 | 1.87 | 1.80 | 1.72 | 1.55 | 1.23 |
| Example 5 | 3.94 | 3.82 | 3.75 | 3.62 | 3.18 |
| Example 6 | 3.76 | 3.63 | 3.49 | 3.38 | 3.26 |
| Example 7 | 1.75 | 1.68 | 1.55 | 1.49 | 1.18 |
| Example 8 | 12.22 | 11.65 | 10.75 | 10.02 | 9.93 |
| Example 9 | 1.75 | 1.66 | 1.58 | 1.47 | 1.28 |
| Example 10 | 1.82 | 1.71 | 1.63 | 1.50 | 1.19 |
| Comparative Example 1 | 1.69 | 1.62 | 1.56 | 1.53 | 1.48 |
| Comparative Example 2 | 2.53 | 2.38 | 2.23 | 1.63 | 0.94 |
| Comparative Example 3 | 1.54 | 1.48 | 1.56 | 1.45 | 1.53 |
| Comparative Example 4 | 2.95 | 2.57 | 2.45 | 1.85 | 0.52 |
| Comparative Example 5 | / | / | / | / | / |

Figure 5:
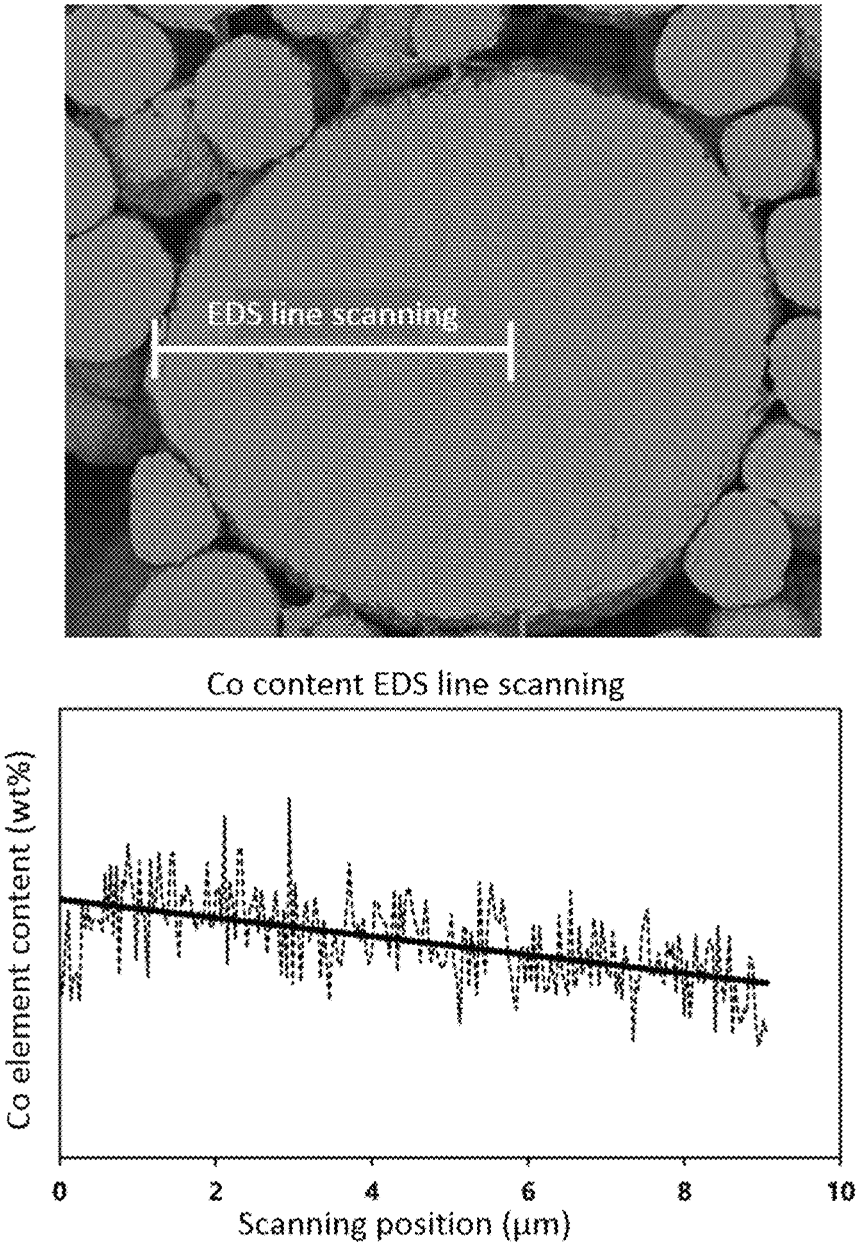
FIG. 5 is an EDS scan image of a cathode material according to Example 1 of the present disclosure.

Example 1 is taken as an example, FIG. 5 is an EDS diagram of a cathode material according to Example 1, and it can be seen from FIG. 5 that the Co element is distributed inside the cathode material, and the content of the Co element is gradually reduced from the outside to the inside. Similarly, Examples 2 to 10 have similar technical effects, and the content of the cobalt element distributed inside the cathode material is gradually reduced from the outside to the inside.

Figure 6:
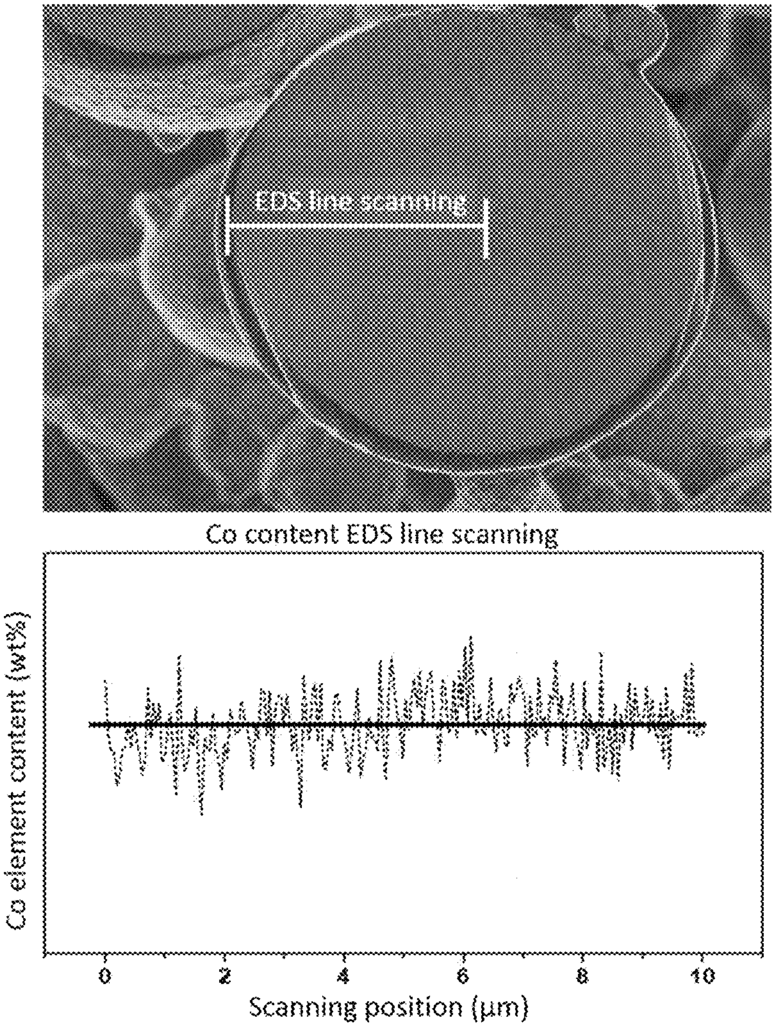
FIG. 6 is an EDS scan image of a cathode material according to Comparative Example 1 of the present disclosure.

Comparative Example 1 is taken as an example, FIG. 6 is an EDS diagram of a cathode material according to Comparative Example 1, and it can be seen from FIG. 6 that the cobalt element is distributed inside the cathode material provided by Comparative Example 1, and the content of cobalt is constant from the outside to the inside. Similarly, in Comparative Examples 2 to 4, the content of the cobalt element distributed inside the cathode material from the outside to the inside is substantially kept constant, or in the innermost layer, the content of the cobalt element is sharply reduced.

Test Example 4

The 2032-type coin cells were prepared by using the cathode materials provided by Examples 1 to 10 and Comparative Examples 1 to 5 as cathode materials, and the specific preparation method was as follows: adding a cathode material, conductive carbon SP, and PVDF (polyvinylidene fluoride) into NMP (N-methylpyrrolidone) base on a mass ratio of 96:2:2, stirring the mixture to obtain a slurry, coating the slurry on an aluminum foil, drying to obtain a cathode sheet, and taking a lithium sheet as an anode sheet to prepare the 2032-type coin cell.

The cathode materials provided by Examples 1 to 10 and Comparative Examples 1 to 5 were subjected to a Ni content test, which was performed by the following steps: weighing 1 g of the cathode material, digesting with nitric acid, making up to a volume of 100 mL, diluting by 200 times, and performing element content test by using a PE8000S reaction-coupled plasma instrument, and the results are shown in Table 1.

The 2032-type coin cells were prepared by using the cathode materials provided by Examples 1 to 10 and Comparative Examples 1 to 5 as cathode materials, and then the 2032-type coin cells were respectively subjected to tests of capacity per gram in the first cycle at 0.1 C, rate and 50-cycle retention rate. The results are shown in Table 3 below.

The test of capacity per gram in the first cycle at 0.1 C included the following steps: charging and discharging a 2032-type coin cell at 25° C. between 3.0 V and 4.3 V at 0.1 C/0.1 C to test the capacity per gram in the first cycle.

The test of rate included the following steps:

after testing the 2032-type coin cell at 25° C. between 3.0 V and 4.3 V in the first cycle, charging/discharging the 2032-type coin cell at 0.50/0.50, 0.5 C/1 C, 0.5 C/2 C each for one cycle, so as to determine the rate capability.

The test of 50-cycle retention rate included the following steps: charging and discharging the 2032-type coin cell at 25° C. between 3.0 V and 4.3 V at 0.5 C/1 C to test cycle performance.

The materials prepared in Examples 1 and 8 were tested for impedance by the following methods: after testing the 2032-type coin cell at 25° C. between 3.0 V and 4.3 V in the first cycle, charging the 2032-type coin cell to 50% SOC at 0.1 C, taking off the cell, and performing impedance test at −5° C. by using an IviumStat electrochemical workstation, wherein the test frequency was 0.03-$10^5$ Hz, and the test amplitude was 5 mV.

TABLE 3

| | Ni content (mol %) | Capacity per gram in the first cycle at 0.1 C (mAh/g) | Rate % (2 C/ 0.1 C) | 50-cycle retention rate (%) |
|---|---|---|---|---|
| Example 1 | 98.3 | 243.7 | 90.3 | 93.5 |
| Example 2 | 98.5 | 240.5 | 89.1 | 92.6 |
| Example 3 | 98.3 | 242.1 | 91.2 | 94.2 |
| Example 4 | 98.4 | 241.1 | 89.7 | 92.4 |
| Example 5 | 96.2 | 237.2 | 89.5 | 94.3 |
| Example 6 | 96.3 | 236.9 | 89.0 | 92.7 |
| Example 7 | 98.3 | 240.3 | 89.8 | 92.5 |
| Example 8 | 90.3 | 221.3 | 89.1 | 96.2 |
| Example 9 | 98.4 | 242.3 | 90.8 | 91.3 |
| Example 10 | 98.4 | 241.6 | 90.6 | 90.5 |
| Comparative Example 1 | 98.3 | 238.5 | 85.2 | 87.3 |
| Comparative Example 2 | 98.2 | 241.7 | 88.5 | 89.2 |
| Comparative Example 3 | 98.4 | 244.5 | 87.3 | 86.4 |
| Comparative Example 4 | 98.3 | 240.3 | 87.9 | 87.6 |
| Comparative Example 5 | 100 | 245.7 | 81.3 | 74.2 |

It can be seen from the data of Examples 1 to 10 in Table 3 that the cathode material prepared by the preparation method provided by the present disclosure has excellent rate capability and good cycle performance.

It can be seen from the comparison of the data of Examples 1 to 7 and 9 to 10 with the data of Example 8 that when the molar content of the cobalt compound in the mixture of the nickel hydroxide and the cobalt compound is 0.5-5%, the prepared cathode material has higher Ni content, lower impedance, and higher capacity.

Figure 7:
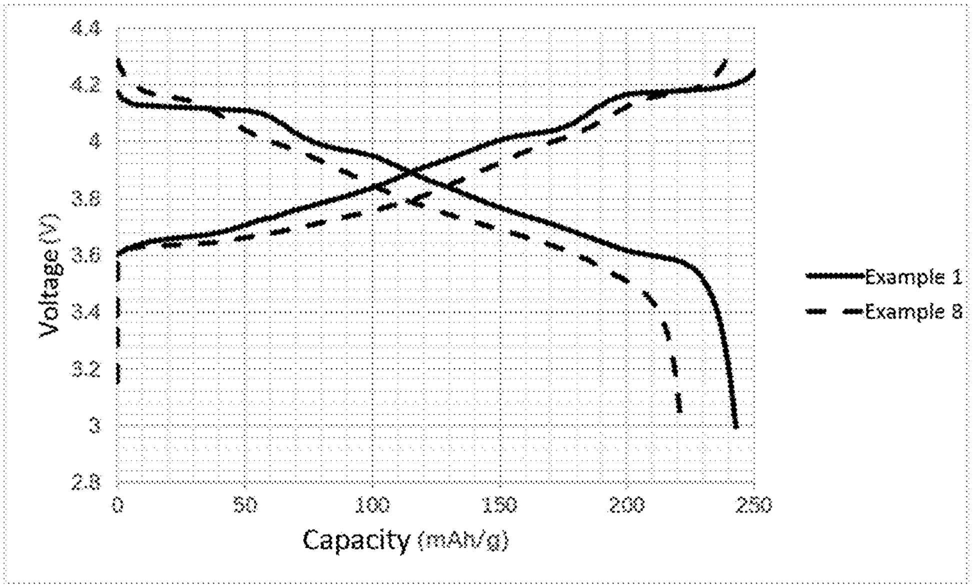
FIG. 7 is a comparative graph of capacities of 2032-type coin cells prepared by respectively using the cathode materials according to Example 1 and Example 8 of the present disclosure.
Figure 8:
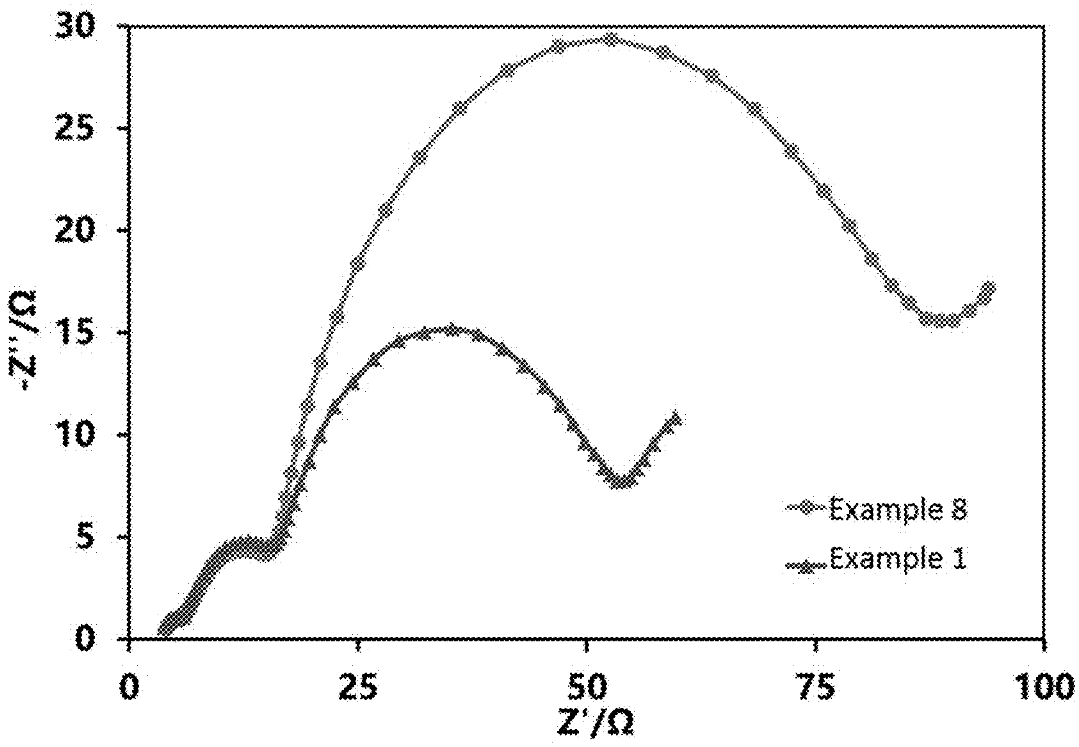
FIG. 8 is a comparative graph of impedances of 2032-type coin cells prepared by respectively using the cathode materials according to Example 1 and Example 8 of the present disclosure.

FIG. 7 is a comparative graph of the capacities of 2032-type coin cells prepared by using the cathode materials provided by Example 1 and Example 8 of the present disclosure as cathode materials, and FIG. 8 is a comparative graph of the impedances of 2032-type coin cells prepared by using the cathode materials provided by Example 1 and Example 8 of the present disclosure as the cathode materials. It can be seen from the comparison of the data of Example 1 and Example 8 and the analysis of FIG. 7 and FIG. 8 that the reduction of Ni content leads to the reduction of the capacity of the material, and the increase of Co content leads to the excessive thickness of the coating layer, which reduces electronic conductivity of the material, increases the impedance of the material, and reduces the rate and cycle performance of the material.

It can be seen from the comparison of the data of Example 1 and Comparative Example 1 that the decrease of the content of trivalent cobalt in the raw material will cause more cobalt element to be doped inside the material, and the coating layer on the surface of the material is insufficient, such that the side reaction between the material and the electrolyte is not inhibited, and the cycle stability of the material is reduced.

It can be seen from the comparison of the data of Example 1 and Comparative Example 5 that the cathode material without cobalt coating has higher capacity, however, the rate and cycle performance of the material are significantly reduced due to the lack of doping and coating effects of cobalt.

Finally, it should be noted that the foregoing examples are merely intended for describing the technical solutions of the present disclosure other than limiting the present disclosure. Although the present disclosure is described in detail with reference to the foregoing examples, those of ordinary skill in the art should understand that they may still make modifications to the technical solutions described in the foregoing examples or make equivalent replacements to some or all technical features thereof, without departing from the scope of the technical solutions of examples of the present disclosure.

INDUSTRIAL APPLICABILITY

The cathode material provided by the present disclosure improves the conductivity of lithium ions and simultaneously significantly improves the rate capability and the cycle stability, and has the advantages of good cycle performance, high safety performance, and the like. Meanwhile, the method for preparing the cathode material provided by the present disclosure realizes doping of cobalt element inside the material and coating of the cobalt element on the material surface at the same time, thereby effectively inhibiting phase change of the material and the side reaction between the material and an electrolyte, and significantly improving the rate capability and the cycle stability of the material while improving the conductivity of lithium ions. The method is simple, stable and safe, is easy for large-scale industrial production, and has a wide application prospect.

What is claimed is:

1. A cathode material, comprising a lithium-nickel composite oxide particle, wherein an outer surface of the lithium-nickel composite oxide particle is coated with a lithium cobalt oxide coating layer, and a cobalt element is distributed inside the lithium-nickel composite oxide particle; and a general formula of the lithium-nickel composite oxide is $Li_aNi_{1-x-y}Co_xM_yO_2$, wherein $0.95 \le a \le 1.10$, $0<x \le 0.05$, $0<y \le 0.005$, and M comprises at least one of a group 2 element, a group 13 element and a transition metal element, and does not comprise nickel and cobalt, and the lithium-nickel composite oxide particle has divalent cobalt and trivalent cobalt distributed, the divalent cobalt is distributed inside the lithium-nickel composite oxide particle, and the trivalent cobalt is distributed on a surface of the lithium-nickel composite oxide particle.

2. The cathode material according to claim 1, wherein the cathode material satisfies at least one of following conditions a to b:

a. a molar content of the cobalt element inside the lithium-nickel composite oxide particle is gradually reduced from an outside to a center; and b. a reduction rate of a molar content of the cobalt element is 0.025 mol %/μm to 0.3 mol %/μm starting from an outer surface of the lithium-nickel composite oxide particle and extending from an outside to a center.

3. The cathode material according to claim 2, wherein the cathode material satisfies at least one of following conditions a to c:

a. in the cathode material, nickel has a molar content more than 94%;

b. the lithium-nickel composite oxide particle has an average particle size of 3 μm to 17 μm; and c. the lithium cobalt oxide coating layer has a thickness of 20 nm to 200 nm.

4. The cathode material according to claim 2, wherein the M comprises at least one of Mg, Ca, Sr, Ba, B, Al, Ti, Zr, V, Nb, Ta, Y, Mo, W, La, Ce, and Gd.

5. The cathode material according to claim 1, wherein the cathode material satisfies at least one of following conditions a to c:

a. in the cathode material, nickel has a molar content more than 94%;

b. the lithium-nickel composite oxide particle has an average particle size of 3 μm to 17 μm; and c. the lithium cobalt oxide coating layer has a thickness of 20 nm to 200 nm.

6. The cathode material according to claim 1, wherein the M comprises at least one of Mg, Ca, Sr, Ba, B, Al, Ti, Zr, V, Nb, Ta, Y, Mo, W, La, Ce, and Gd.

7. A method for preparing the cathode material according to claim 1, comprising following steps:

coating a composite containing a lithium compound, a cobalt compound, and an M compound on a surface of nickel hydroxide, and sintering a coated material under an oxygen atmosphere to obtain the cathode material, wherein the cobalt compound comprises a divalent cobalt compound and a trivalent cobalt compound, and M in the M compound comprises at least one of a group 2 element, a group 13 element and a transition metal element, and does not comprise nickel and cobalt.

8. The method for preparing the cathode material according to claim 7, wherein the M compound comprises at least one of an oxide of the M, a hydroxide of the M, and a phosphate of the M.

9. The method for preparing the cathode material according to claim 8, wherein the cathode material satisfies at least one of following conditions a to d:

a. a molar content of the cobalt compound in a mixture of the nickel hydroxide and the cobalt compound is 0.5% to 5%;

b. a molar content of the trivalent cobalt compound in the cobalt compound is 50% to 85%;

c. the lithium compound comprises at least one of lithium hydroxide or lithium carbonate; and d. the cobalt compound comprises at least one of cobalt hydroxide, cobalt oxyhydroxide, cobalt monoxide, and cobaltic oxide.

10. The method for preparing the cathode material according to claim 8, wherein the method satisfies at least one of following conditions a to d:

a. the method further comprises steps of washing, drying, and secondary sintering sequentially performed after the sintering;

b. the method further comprises steps of washing, drying, and secondary sintering sequentially performed after the sintering, wherein the secondary sintering is performed at a temperature of 250° C. to 700° C. for 5 h to 15 h;

c. the method further comprises steps of washing, drying, and secondary sintering sequentially performed after the sintering, wherein the secondary sintering is performed in the oxygen atmosphere; and d. a content of oxygen in the oxygen atmosphere is greater than or equal to 90%.

11. The method for preparing the cathode material according to claim 7, wherein the cathode material satisfies at least one of following conditions a to d:

a. a molar content of the cobalt compound in a mixture of the nickel hydroxide and the cobalt compound is 0.5% to 5%;

b. a molar content of the trivalent cobalt compound in the cobalt compound is 50% to 85%;

c. the lithium compound comprises at least one of lithium hydroxide or lithium carbonate; and d. the cobalt compound comprises at least one of cobalt hydroxide, cobalt oxyhydroxide, cobalt monoxide, and cobaltic oxide.

12. The method for preparing the cathode material according to claim 11, wherein the cathode material satisfies at least one of following conditions a to b:

a. the lithium compound, the cobalt compound, and the M compound are coated on a surface of the nickel hydroxide in solid-phase mixing; and b. the lithium compound, the cobalt compound, and the M compound are coated on a surface of the nickel hydroxide in solid-phase mixing, wherein the solid-phase mixing comprises mechanical mixing.

13. The method for preparing the cathode material according to claim 11, wherein the method satisfies at least one of following conditions a to c:

a. a ratio of a sum of molar contents of the nickel hydroxide, the cobalt compound and the M compound to a molar content of the lithium compound is 1:0.95-1.1;

b. the nickel hydroxide has an average particle size of 3 μm to 17 μm; and c. the nickel hydroxide is spherical.

14. The method for preparing the cathode material according to claim 11, wherein the cathode material satisfies at least one of following conditions a to b:

a. a content of oxygen in the oxygen atmosphere is greater than or equal to 98%; and b. the sintering is performed at a temperature of 600° C. to 750° C. for 8 h to 20 h.

15. The method for preparing the cathode material according to claim 7, wherein the cathode material satisfies at least one of following conditions a to b:

a. the lithium compound, the cobalt compound, and the M compound are coated on a surface of the nickel hydroxide in solid-phase mixing; and b. the lithium compound, the cobalt compound, and the M compound are coated on a surface of the nickel hydroxide in solid-phase mixing, wherein the solid-phase mixing comprises mechanical mixing.

16. The method for preparing the cathode material according to claim 7, wherein the method satisfies at least one of following conditions a to c:

a. a ratio of a sum of molar contents of the nickel hydroxide, the cobalt compound and the M compound to a molar content of the lithium compound is 1:0.95-1.1;
b. the nickel hydroxide has an average particle size of 3 μm to 17 μm; and
c. the nickel hydroxide is spherical.

17. The method for preparing the cathode material according to claim 7, wherein the cathode material satisfies at least one of following conditions a to b:
a. a content of oxygen in the oxygen atmosphere is greater than or equal to 98%; and
b. the sintering is performed at a temperature of 600° C. to 750° C. for 8 h to 20 h.

18. The method for preparing the cathode material according to claim 7, wherein the method satisfies at least one of following conditions a to d:
a. the method further comprises steps of washing, drying, and secondary sintering sequentially performed after the sintering;
b. the method further comprises steps of washing, drying, and secondary sintering sequentially performed after the sintering, wherein the secondary sintering is performed at a temperature of 250° C. to 700° C. for 5 h to 15 h;
c. the method further comprises steps of washing, drying, and secondary sintering sequentially performed after the sintering, wherein the secondary sintering is performed in the oxygen atmosphere; and
d. a content of oxygen in the oxygen atmosphere is greater than or equal to 90%.

19. The method for preparing the cathode material according to claim 5, wherein the M is at least one selected from Mg, Ca, Sr, Ba, B, Al, Ti, Zr, V, Nb, Ta, Y, Mo, W, La, Ce, and Gd.

20. A cathode sheet, comprising the cathode material according to claim 1.

* * * * *